US008237714B1

(12) United States Patent
Burke

(10) Patent No.: US 8,237,714 B1
(45) Date of Patent: *Aug. 7, 2012

(54) LAYERED AND VECTORED GRAPHICAL USER INTERFACE TO A KNOWLEDGE AND RELATIONSHIP RICH DATA SOURCE

(76) Inventor: James Burke, London (GB)

( * ) Notice: Subject to any disclaimer, the term of this patent is extended or adjusted under 35 U.S.C. 154(b) by 1172 days.

This patent is subject to a terminal disclaimer.

(21) Appl. No.: 11/982,957

(22) Filed: Nov. 5, 2007

Related U.S. Application Data

(63) Continuation-in-part of application No. 10/611,822, filed on Jun. 30, 2003, now Pat. No. 7,292,243.

(60) Provisional application No. 60/394,192, filed on Jul. 2, 2002.

(51) Int. Cl.
*G06T 11/20* (2006.01)
*G06F 3/048* (2006.01)

(52) U.S. Cl. .................................. 345/440; 715/764

(58) Field of Classification Search ............ 345/440; 715/764
See application file for complete search history.

(56) References Cited

U.S. PATENT DOCUMENTS

| 5,812,134 | A * | 9/1998 | Pooser et al. | 715/848 |
| 5,945,985 | A * | 8/1999 | Babin et al. | 715/209 |
| 7,292,243 | B1 * | 11/2007 | Burke | 345/440 |

* cited by examiner

*Primary Examiner* — Ryan R Yang
(74) *Attorney, Agent, or Firm* — Matthew Kaser; Adam Warwick Bell; Ernest J. Beffel, Jr.

(57) ABSTRACT

A graphical user interface provides a series of nested spherical surfaces representing a surface and/or human development at differing times in history and prehistory. An embodiment of the present invention, a knowledge web (K-Web), comprises a new, "multiple-intelligences" learning tool aimed at encouraging depth of thinking and understanding in numerous content areas. The K-Web optionally does this by presenting content in a dynamic structure having a multiplicity of interconnections that, used in conjunction with other input and display devices, is readily accessible in many different ways to many different intelligences and cognitive styles, and thus aid in the visualization of and collaboration on "wickedly complex" problems, such as Global Warming and Third World development. It may also be used to predict the outcome when combinations of unrelated individuals, events, and technologies are brought together.

24 Claims, 5 Drawing Sheets
(5 of 5 Drawing Sheet(s) Filed in Color)

FIGURE 3

LAYERED AND VECTORED GRAPHICAL USER INTERFACE TO A KNOWLEDGE AND RELATIONSHIP RICH DATA SOURCE

RELATIONSHIP TO OTHER APPLICATIONS

The present application is a continuation-in-part of U.S. Non-Provisional patent application Ser. No. 10/611,822 entitled LAYERED AND VECTORED GRAPHICAL USER INTERFACE TO A KNOWLEDGE AND RELATIONSHIP RICH DATA SOURCE, filed Jun. 30, 2003 now U.S. Pat. No. 7,292,243, that claimed priority to U.S. Provisional Patent Application Ser. No. 60/394,192 entitled LAYERED AND VECTORED GRAPHICAL USER INTERFACE TO A KNOWLEDGE AND RELATIONSHIP RICH DATA SOURCE, filed Jul. 2, 2002, both of which are herein incorporated by reference in their entirety for all purposes.

FIELD OF THE INVENTION

The present invention relates to visual and graphical representations of data as provided from or derived from a data source. More particularly, the present invention relates to the design, implementation and use of user interfaces to access information rich software data sources, such as databases.

BACKGROUND OF THE INVENTION

Improvements in organizing and accessing information have made tremendous changes in the structure of human society throughout history and pre-history. The development of more effective visually based user interfaces for the retrieval and presentation of information stored in software databases is a fundamental dynamic of information technology. The invention of the graphical user interface (GUI) and the mouse input device greatly increased an end-user's access to information stored within a computer system or other machine. The advances in the art of computer system user interface design made possible by the mouse and the GUI greatly expedited the expansion of computing systems into the economic mainstream of the world community.

The prior art of computer user interfaces is focused generally upon retrieving information as specifically requested by an end-user and within a systematically imposed narrow informational context or content. This conventional narrowness of informational content is found in the prior art both in the processes of accepting and deconstructing data queries, and in providing data that are selected from the database and that are then used to form answers to user queries. Contemporaneously, however, with the propagation of GUIs, the mouse, and other user information selection and indication tools, the art of computer system design and manufacture has made great strides in creating economically efficient database hardware and software appliances and products that often outstrip the ability of prior art user interfaces to optimally enable access to data existing within the computer system or other machine. There is, therefore, a long felt need to increase the availability of data stored within a computer system to the user by enhancing the capacity of the user interface visually, graphically, textually, and/or by other sensory output modes to represent data, and relationships among data, stored in a computer system or other machine.

SUMMARY OF THE INVENTION

A graphical user interface (GUI) is provided, the GUI comprising: a plurality of surfaces; a plurality of nodes, the plurality of nodes comprising a first node and a second node and each node associated with a location on at least one of the plurality of surfaces; and a plurality of lines, at least one line having a first endpoint associated with the first node an a second endpoint associated with the second node.

In a second embodiment, the invention provides an image generated by a machine, the image having at least one virtual surface; at least one first node on the virtual surface; at least one second node on the virtual surface; at least one line having an endpoint associated with the first node and a second endpoint associated with the second node; wherein each node is linked to a curated database of records; wherein each line represents a relationship between the associated nodes; and wherein the relationships form a relational network and the relational network is a part of a knowledge web.

In a third embodiment, the invention provides a method of building a knowledge web, the method comprising: assembling a plurality of records wherein the records have a plurality of individual data; linking at least one first record with at least one second record, the records thereby having a relationship between the records through the link; selecting a mathematical model that defines the relationship of the records through the link; and recognizing the relationship among the records, thereby building the knowledge web.

In one embodiment the surface is a shape, the shape being selected from the group consisting of: a sphere, a cube, a cuboid, a rhomboid, a torus, a tetrahedron, a prism, a pyramid, a cone, a cylinder, and sections thereof. In another embodiment the nested surface has an irregular shape and sections thereof. In another embodiment, the surfaces are nested surfaces.

In another embodiment, the invention provides a GUI wherein the nested spherical surface is a representation of a planet's surface at a particular time. In yet another embodiment, the planet is selected from the known planets. In another embodiment, the nested spherical surface is an environmental surface in a time differentiated format. In yet another embodiment, the nested spherical surface is a set of co-temporal points in a space-time dimension.

In another embodiment, the invention provides an image wherein the virtual surface is a representation of a planet's surface at a particular time. In yet another embodiment, the planet is selected from the known planets. In another embodiment, the virtual surface is an environmental surface in a time differentiated. In yet another embodiment, the virtual surface is a set of co-temporal points in a space-time dimension.

In another embodiment, the invention provides an image wherein the virtual surface is a representation of a planet's surface at a particular time. In yet another embodiment, the planet is selected from the known planets. In another embodiment, the virtual surface is an environmental surface in a time differentiated and distinguished format. In yet another embodiment, the virtual surface is a set of co-temporal points in a space-time dimension.

In another embodiment, the surface is a representation of a shape found in Nature and wherein a node represents a point upon the shape found in Nature. In another embodiment, the surface is a representation of an abstract shape or object, the shape representing a metaphorical or arbitrary shape and wherein a node represents a data point wherein the data point is selected from the group consisting of empirically determined data and other data. In another embodiment, a surface intersects with one or more other surfaces.

The invention provides a computer rendered graphical user interface (GUI) presented at a man-machine interface, the GUI comprising a display of: a plurality of nested spherical surfaces, wherein each surface represents a surface of the Earth at a particular time period; a plurality of nodes, the plurality of nodes comprising at least one first node and at least one second node, and each node associated with a location on at least one of the plurality of spherical surfaces; and a plurality of lines, at least one line having a first endpoint associated with the first node and a second endpoint associated with the second node, and a graphical user interface control. In a more preferred embodiment more than one line can be associated with a first node and a second node. In a more preferred embodiment the line represents a relationship between the nodes. In a most preferred embodiment, the relationship is selected from the group consisting of a social relationship, an historical relationship, a geographical relationship, a temporal relationship, a cultural relationship, a linguistic relationship, a genetic relationship, a familial relationship, a technological relationship, and a mathematical relationship. In another preferred embodiment, the relationship between the nodes is used to determine a relationship between another pair of nodes.

In one alternative embodiment the surface of the Earth is a representation selected from the Earth's geography and human development. In a preferred embodiment, the representation of the Earth's geography is selected from the group consisting of topography, political units, lines of communication, centers of economic activity, the geology of the underlying and exposed rock, and the tectonic properties of the continental and oceanic plates of the crust. In another preferred embodiment the representation of the Earth's geography is selected from the group consisting of topography, political units, lines of communication, centers of economic activity, the geology of the underlying and exposed rock, and the tectonic properties of the continental and oceanic plates of the crust. In another embodiment the most ancient time surface has the smallest radius and is located closest to a shared center point and the most recent time surface has the largest radius from the shared center point. In another embodiment the GUI further comprises a timebar, the timebar displayed in proximity to the nested surfaces. In another embodiment the GUI further comprises a web-control, the web-control displayed in proximity to the nested surfaces. In a preferred embodiment, the web-control is a turn/zoom web-control. In an yet further embodiment, the GUI further comprises a help avatar, the help avatar displayed in proximity to the nested surfaces. In a preferred embodiment, the help avatar is a semi-translucent hologram head and shoulders of an individual. In another embodiment, the GUI further comprises a globe icon, the globe icon displayed in proximity to the nested surfaces. In another alternative embodiment, the GUI further comprises a hyperlink to a user community forum.

The invention also provides an image generated by a machine displayed by a man-machine interface, the image having: at least one virtual surface, wherein the at least one virtual surface is invisible to a user of the man-machine interface, and the at least one virtual surface represents a particular time period; at least one first node on the virtual surface; at least one second node on the virtual surface; at least one line having an endpoint associated with the first node and a second endpoint associated with the second node; wherein each node is hyperlinked to a curated database of records; wherein each line represents a relationship between the associated nodes; and wherein the relationships form a relational network and the relational network forms a part of a knowledge web in at least a three-dimensional virtual space displayed by the man-machine interface. In a preferred embodiment, the line between the two nodes further is described by a mathematical model in multi-dimensions. In another preferred embodiment more than one relationship can be associated with a first node and a second node. In a preferred embodiment, the curated database of records comprises the biographical records of individuals stored on machine-readable media. In an alternative embodiment, the image further displays the relationships between more than two individuals' records. The invention also provides the image generated by the machine further comprising an interface control display and wherein the image can be manipulated by a user at the man-machine interface using the interface control.

The invention also provides a method for creating a graphical user interface (GUI) for discovering relationships between curated records in a database, the GUI presented at a man-machine interface, the method comprising the steps of: (i) providing a software program on machine readable media; (ii) providing a curated database on machine-readable media; (iii) rendering a plurality of nested spherical surfaces, wherein each surface represents a surface of the Earth at a particular time period; (iv) rendering a plurality of nodes, the plurality of nodes comprising at least one first node and at least one second node, and each node associated with a location on at least one of the plurality of spherical surfaces; (v) rendering a plurality of lines, at least one line having a first endpoint associated with the first node and a second endpoint associated with the second node; (vi) rendering a graphical user interface control; (vii) hyperlinking each node to a record in the database, each record having a unique identifier; (viii) rendering the unique identifier at the respective node; (ix) high-lighting nodes having lines associated with at least two other nodes, thereby creating a relationship between the nodes; the steps resulting in creating a GUI for discovering relationships between curated records in a database.

The invention further provides a method for building a knowledge web, the method comprising: (i) assembling a plurality of records wherein the records have a plurality of individual data; (ii) linking at least one first record with at least one second record, the records thereby becoming related to one another through the link and thereby creating a relationship between the records; (iii) selecting a mathematical model that defines the relationship between the records in multi-dimensional space; and (iv) recognizing the relationship between the records; thereby building the knowledge web. In a preferred embodiment, the multi-dimensional space is at least three-dimensional space. In another preferred embodiment, the multi-dimensional space is at least four-dimensional space. In another preferred embodiment, the link is associated with at least one relationship and more than one relationship can be associated with a first record and a second record.

The present invention optionally provides a graphical user interface (GUI) tool-suite that visually displays information by means of text, images, photographic images, cartoons, symbols, shapes, geometric shapes, orientations between and among elements of the user interface, lines, colors and other suitable data and data attribute indicating and presenting techniques known in the art. In one embodiment of the present invention a plurality of data objects are visually presented to a user as a knowledge web image. The data object, or node, may optionally contain or be associated with data contained in a record or document, and presented as textual, photographic, or visual images, or by other suitable information display qualities or sensory output means. Each data object may be associated with a point within a three dimensional model of nested spherical surfaces, wherein one or more spherical surfaces may be translucent or transparent to one or more other spherical surfaces. Each nested spherical surface may be a representation of the Earth's surface at a particular time. The nested spherical surfaces may alternately or additionally represent another planet's surface or an environmental surface in a time differentiated format. Alternatively, the nested spherical surfaces may represent a set of co-temporal points in space-time dimensions with the different nested spherical surfaces representing different points in time. In one embodiment, the visual representation of the spherical surface on the screen may be changed by rotating or otherwise manipulating a globe icon by means of a graphical user interface control. The user may, by using a mouse or other suitable input device or technique, move the cursor to either of, for example, two arrows of the graphical user interface control. The user may thereby instruct the K-Web to rotate or otherwise move the displayed representations of the globe icon and/or the K-Web database. The globe icon and arrows may thereby be used as method of directing, implementing, controlling, enabling or using the data filter and/or data selection functions or commands of the present invention.

In another embodiment, the GUI is displayed using a virtual reality system. In yet another embodiment, the GUI is displayed using a projector onto a surface. In a still further embodiment, the GUI is displayed using electromagnetic radiation (EMR) to perturb the diffraction and refraction behavior of components of a translucent composition. In a still further embodiment, the GUI is displayed using EMR or electrical signals to stimulate neural regions of a user's visual cortex or the like. In an alternative embodiment the GUI is controlled by the user using a biofeedback device, the biofeedback device detecting electrical signals in the user's brain, interpreting those signals, translating those signals into signals that are directed to a software program that operates the GUI, and the software program changing an element displayed by the GUI, thereby allowing the user to manipulate the GUI using neural biofeedback.

In yet another embodiment, the user can personalize the content of the present invention. The user can input information and data into the database using means of write input, audio input, and the like. The inputted information and data into the database can create a personalized presentation and record. The inputted information and data may be curated and moderated by another user, or in the alternative, can be inputted without modification by another user. The presentation and personalized record may be only accessed by the user, or, alternatively, can be accessed by any user. In a still further embodiment, the K-Web can save a memory of steps used by a user and relational network and thereby effect a virtual intellect.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

FIG. 3 is an exemplary embodiment of a GUI visually representing a document, a node, or a data object, or data comprised therein.

DETAILED DESCRIPTION

The Invention

Figure 1:
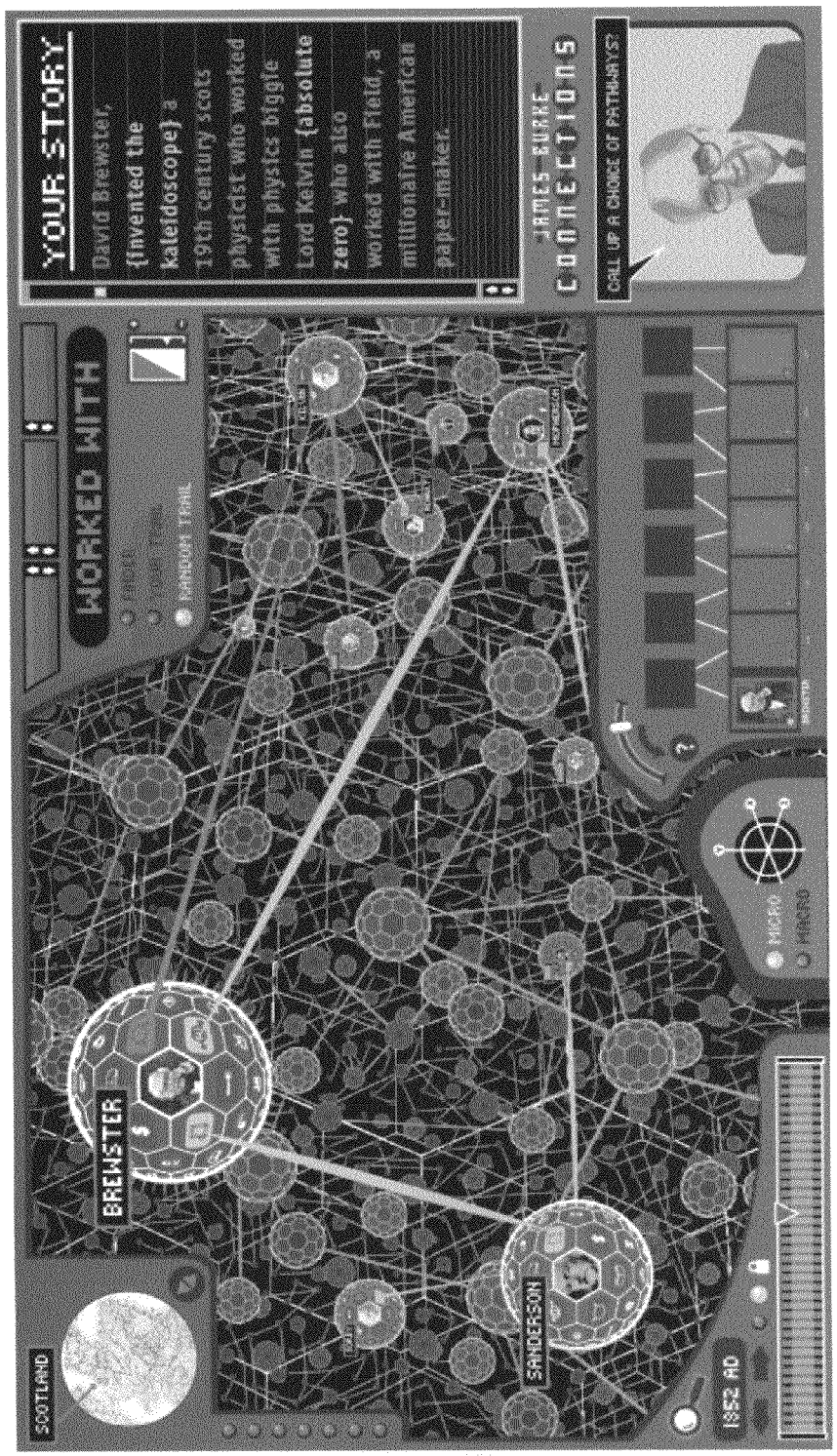
FIG. 1 is an exemplary embodiment of a GUI visually representing data objects (or nodes) and lines showing their relationships.

In describing the embodiments, certain terminology is utilized for the sake of clarity. Such terminology is intended to encompass the recited embodiment, as well as all equivalents. Reference is made in the following detailed description of the embodiment to the drawings accompanying this disclosure. These drawings illustrate exemplary embodiments in which the invention may be practiced. It is to be understood that other embodiments may be utilized and structural changes may be made by one skilled in the art and in light of this disclosure and without departing from the scope of the claims of the present invention.

It must be noted that as used herein and in the appended claims, the singular forms "a," "an," and "the" include plural reference unless the context clearly dictates otherwise. Thus, for example, a reference to "a surface" includes a plurality of such surfaces, and a reference to "a node" is a reference to one or more nodes and equivalents thereof, and so forth.

The technology provided herein discloses a graphical user interface (GUI) that comprises at least one first node located on at least one surface, at least on second node located on at least one surface, and at least one line wherein a first endpoint of the line is associated with a first node and a second endpoint of the line is associated with a second node, and wherein the line represents a relationship between the nodes. A plurality of nodes and lines represents a relational network and may be defined by a mathematical model.

In one embodiment, the technology provided herein discloses a graphical user interface (GUI) used to create a knowledge web (K-Web). The GUI may be used to retrieve data and records from a database and then establish a relationship between those data and records by using the GUI to connect the data and records as described below in one of the embodiments and in the examples section. The relationships can then be used to make a relational network to improve the K-Web. In still another embodiment, information, data, records, and the like, can be inputted by a user to the database, thereby further improving the K-Web. The information, data, records, and the like, can be inputted by the user and not be modified by another user. In the alternative, the inputted information, data, records, and the like, can be curated and moderated or modified by another user.

In another embodiment, the user can personalize the content of the present invention. The user can input information and data into the database using means of write input, audio input, and the like. The inputted information and data into the database can create a personalized presentation and record. The personalized presentation and record may be only accessed by the user, or, alternatively, can be accessed by any user. In a still further embodiment, the invention can save a memory of steps used by a user and relational network and thereby effect a virtual intellect.

The technology enables the user, in certain embodiments, to manipulate a first data object onto and into a second data object, whereby relational network connections found between the first and the second data objects are determined. These identified connections are then presented to the user as relevant facts, suppositions, inferences, suspicions, assumptions, beliefs, deductions or possibilities. These identified connections can also be mathematical relationships between the data objects.

The technology can comprise other nesting or even intersecting three-dimensional shapes that can be used to represent concepts, where the shape may be metaphorical, or even arbitrary, in relation to the concepts, which can contain nodes with intersecting lines representing abstract relationships. The technology can be used for other forms of representational images: for example a brain, a larval form of an animal, a plant, a genealogy, a biochemical network, a genetic network, or the like.

As one example, the K-Web may be designed to show the events of the Iron Age with each event or particular events associated with a location on the surface of the earth and upon a first globe surface. The first globe surface may then be nested within a second globe surface, wherein the second globe surface is transparent or semi-transparent and the first globe surface is visible to the user through the second globe surface. The first and second globe may optionally substantially share the same center point but the second globe has a larger radial distance from the shared center point than the Iron Age globe has. The second globe may also have a set of data objects that are each associated with a particular geographic spot or area of the second globe surface. Lines or vectors may pass from one data object to another data object, and from data objects on the same globe surface or on different globe surface. The lines may be colored or shaped to indicate the nature of the relationship indicated by the presentation of a line connecting two data objects. For example, a red line or vector may indicate that technical information originating at one place on the Earth's surface at one point in time was transmitted to another location of the Earth's surface at another time period or age. For example, the communication of Greek mathematical knowledge from Athens in the time of Pericles, to the Arabia of the ascendant Muslim period, to the Spain of El Cid, and finally to the Venice of the fifteenth century, could be traced from data objects associated with differing time periods, as represented by differing radii from the shared center point. Red colored lines crossing from points on individuated surfaces of a plurality of nested globes, where each nested surface represents a time or time period in history or prehistory, and each red line passes between representations of geographic locations of the Earth's surface in a pre-established time period. Lines may be used within the method of the present invention to represent a plurality of types of relationships or relational networks, such as cultural, linguistic, genetic, familial, and other suitable relationship types existing or alleged to exist between peoples, places, things, events, and ideas. Colors and/or thickness of the line to represent different types of relationships may be chosen by the user or by another user or an administrator, or the like.

The K-Web may optionally be interpreted or presented as an image of a series of nested concentric surface layers, wherein each layer is a representation of the Earth's geography, and/or human development, at a pre-selected, given, or pre-identified time or time period. The discrete layers may be presented as substantially translucent, whereby several time period surfaces are simultaneously visible to the user. The temporal linearity of each surface or nested globe may be ordered or represented by placing each time period surface along a continuum of radii, wherein the most ancient surface has the smallest radius and is located closest to the shared center point and the most recent time period surface has the largest radius from the shared center point. In the K-Web the user may manipulate the orientation of the nested globe surfaces to bring a desired area of the Earth's geographic surface closer to or further away from the user's viewpoint.

The K-Web may be presented as having a plurality of data objects, where each data object may be selected by the user with a mouse or another suitable data indication or selection device or method. The user may select two data objects, whereupon the K-Web visually or audibly presents to the user the relationships and connections existing between the two selected data objects. By this optional aspect of the method of the present invention the K-Web more powerfully retrieves and presents information stored in a database or databases and more expansively informs and educates the end user about the information related to the query generated by the user. For example, a single query on flight training drawing on various intelligence and law enforcement databases could be displayed as a social network, some relationships known and others suggested. The system may have competitive intelligence uses, for example displaying the consequences of a disruption in a company's supply chain, as well as displaying a social network of people or entities who could help solve the problem. In addition, the system could be used to investigate any "wickedly complex" problem by allowing the user to visual and manipulate complex relationships, such as an ecosystem, a group of trading partners, a corporation, a community, or the like. The system may have predictive capabilities by identifying similar clusters or constellations of relationships in present and past situations, thus suggesting strategies to be emulated or avoided. In another embodiment, the system could additionally identify slight differences or anomalies between situations, which might suggest a strategy for research or action.

The K-Web comprises a plurality of nodes, records and/or documents that have information linking one or more document files to other document files. The files may comprise XML software records or files, or other suitable databases, database software, or software languages. Each record or document file may be associated with a node and/or a geographic location, and additionally with a time-related surface or time-period related surface of one or more of the nested globes. The link of one record to another record may then be presented visually to the user by means of lines. The mapping of the nodes may be accomplished with a suitable 3-dimensional geometric or geographic modeling system.

The K-Web is used to retrieve information stored within a machine, a computer, or within a computer network, such as an intranet, an extranet, and/or the Internet. The network can be linked by electric conducting means or by wireless means. The K-Web may include or be included within a fully or partially immersive three-dimensional environment GUI in which one or more users may enter into an historical or fictive virtual reality scenario or game space. In certain embodiments of the present invention a user or users may simultaneously or near simultaneously interact with other users, representations of objects, symbols, and/or historical personalities within the virtual reality scenario. In certain alternate embodiments of the present invention, two or more users may role play as historical or fictional characters, as well as work towards solving problems or answering questions, either cooperatively or in competition, within a game, teaching or learning scenario, while optionally providing answers in real time or interjecting new ideas, questions, or information, into the scenario. In certain embodiments the user may direct the K-Web to present data objects related to a particular point in time by user input of a calendar date, or by optionally by input of a year, season, month and/or day of the week or month.

The K-Web is also used to present simulations, whereby the simulations can occur in an immersive interactive environment. In an alternative embodiment, the environment can be a three-dimensional environment. In another alternative embodiment, the environment can be a four dimensional environment.

The K-Web can be used to provide a single navigable construct whereby the user can navigate through both time and space, the dimensional parameters being displayed using, for example, a timeline and a geographical representation of the Earth. The timeline can be displayed using a timebar, a clockface, or the like. In one embodiment, the timeline is a display showing a linear representation of time, for example, from between AD 465 through AD1491, of from between 1600 BCE and AD 312. The user can advance time by, for example, moving a cursor or a graphical representation of a knob to the right, or reverse time by, for example, moving the cursor or the knob to the left. In another embodiment, the timeline is a spiral and the change of time can be achieved by moving a cursor in one direction to advance the timeline, or moving the cursor in an opposite direction to reverse the timeline. In one embodiment, the geographical representation of the Earth comprises topography. In another embodiment, the surface of the Earth comprises political units. In a yet further embodiment, the surface of the Earth comprises lines of communication. In a still further embodiment, the surface of the earth comprises centers of economic activity. In a yet still further embodiment, the surface of the Earth comprises the geology of the underlying and exposed rock. In another embodiment, the surface of the Earth comprises the tectonic properties of the continental and oceanic plates of the crust.

In certain alternate embodiments of the present invention, the user is provided with an ability to record, save, share, annotate, and export journeys or interaction histories as executable files, for example to send such journeys or histories to another user. The receiving user may thereby run or execute the transmitted file and observe or modify the experience of the first user.

In certain alternate embodiments of the present invention, the user is provided with the ability to enter his or her own content into a curated database, or into a personalized or group access limited database, computer network, extranet, intranet, and/or Internet web pages. In a further embodiment, the user can input information about his or her areas of expertise and indicate what sorts of interactions are desired with other users.

The K-Web may be built using a combination of the following steps:
  assembling a collection of records, wherein a plurality of records have a plurality of individual data;
  creating a potential or actual relationship between or among sets of individual data contained in two or more records;
  hyperlinking related data found in separate records, or using other suitable data relating methods to relate or associate said data;
  selecting a mathematical model that defines the relational network and recognizes the relationships existing between and among said data as found in separate records;
  forming the model with ordered spherical surfaces, the surfaces comprising transparent, semi-transparent, or translucent surfaces, where each surface is located about a common center point;
  presenting views to the user on a two-dimensional display device, such as a CRT or a flat panel display or a LCD screen or a three-dimensional image display device; and
  presenting and manipulating views to the user on a two-dimensional display and/or input device, such as a CRT or a flat panel display or a LCD screen or a three-dimensional image display device.

Mathematical models that can define relationships between at least two or more points and that can define relational networks are well known to those of skill in the art and may be used singly or in combination with other mathematical models. See, for example, J. Monod (1971) Chance and Necessity, Knopf, New York, N.Y.; A. Cornish-Bowden (1979) Fundamentals of Enzyme Kinetics, Butterworths, London, U.K.; J. L. Heilbron (1998) Geometry Civilized: History, Culture, and Technique, Oxford University Press, Oxford, U.K.; Giladi et al. (2002) Bioinformatics 18: 873-877; Somogyi and Creller (2001) Drug. Disc. Today, 6: 1267-1277; Vance et al. (2002) Proc. Natl. Acad. Sci., 99: 5816-5821; and Lenton and van Oijen (2002) Philos. Trans. R. Soc. Lond. B Biol. Sci., 357: 683-695.

There are many different ways known in the art that may be used to determine relationships between two or more points. In general they utilize graphical techniques to plot the points upon a surface, usually, but not limited to, a two-dimensional surface. The distances between a plurality of the points are measured, an average distance is determined and that average distance is then used to define an imaginary center of a cluster of the plurality of the points, and the distance between each of the points and the imaginary center is then used to generate a probability value that the points cluster together. The probability value is usually given as the likelihood that the clustering is improbable. For example, a pair of points that are in proximity to one another and having a probability value P of $10^{-6}$ are more likely to be clustered together than a pair of points having a P value of $10^{-1}$.

Utility

In one aspect of an asserted utility, the invention offers a new way of presenting information in context, rather than the traditional way in which data is isolated, subject-oriented, and often removed from the everyday life of a student. Specifically, there is growing awareness in the academic community of the need to find a fresh approach to learning that is more attuned to the increasingly interactive modern world than was the old, reductionist, memory-based way. With the rapidly-growing pervasion of the Internet in almost every area of life, the invention also offers a learning system that encourages learners to think interactively. While the invention imparts knowledge, it also trains the user in ways of thinking that will become increasingly required for success in the twenty-first century, a substantial and credible utility.

The K-Web system provides the user with an ability to record, save, share, annotate, and export journeys or interaction histories with the K-Web as executable files, wherein the originating user may optionally be able to transmit an executable file to a receiving user. A receiving user may thereby run or execute the transmitted file and observe the experience or investigate the pathway within the K-Web, as captured by an originating user.

The K-Web can provide the user with the ability to enter his or her own content into the database of the present invention, or into a personalized or group access-limited database, computer network, extranet, intranet, and/or Internet web pages. In a particular embodiment the K-Web can provide a user-community tool, wherein the user can interact with other users to create and synthesize a knowledge web that is superior to that which could be potentially constructed by a single user alone. Such examples include, but are not limited to, a user-community forum such as Wikipedia.

In another embodiment, the K-Web can be used to generate a prediction of an event in the future using the knowledge web of the past and present. This may be performed by determining the relationship between at least two nodes whose relationship is unknown by comparing the relationship of a first and a second adjacent nodes that share a known link and using this relationship to determine whether a relationship can exist between the first and/or second node to a third adjacent node. In this embodiment, for example, the distances between nodes and/or the nodes themselves, can be weighted, such that links having no or little connecting effect have a lower weighting than those links that have a strong connecting effect. In one embodiment the nature of the nodes and the strength of the links between them creates a mathematical pattern, and the mathematical pattern can be used to create an exemplary algorithm for the knowledge web. The algorithm may then be applied to a set of nodes and links comprising datasets that represent a current or earlier group of individuals, events, inventions, and/or elements, some having known relationships to one another and others not, and the combination results in a new set of relationships that predict another invention, event, or element that would otherwise not have been apparent to a user or might not have occurred without such a combination.

In an alternative perfect environment there is no weighting and therefore the links between the nodes provide all the information to create a natural knowledge web.

The invention therefore has a credible, specific, substantial, and well-established utility.

The foregoing and other objects and features will be apparent from the following description of the embodiment of the invention as illustrated in the accompanying drawings.

Referring now generally to the Figures, a GUI and a knowledge web or K-Web, being an embodiment of the present invention, comprises a new, "multiple-intelligence" learning tool aimed at encouraging depth of thinking and understanding for a user in any content area. The K-Web optionally does this by presenting content in a dynamic, webbed structure that is readily accessible in many different ways to many different intelligences, both natural and artificial. There is no single correct way to enter the web, or to travel through many pathways. Any point of entry and choice of pathway will depend on the user's experience and knowledge, so a web journey becomes a constructivist learning experience. In the K-Web, the user may direct the invention to present data objects related to a particular point in time by user input of a calendar date, or by input of a year, season, month and/or day of the week or month into a date icon. The date icon may be located in a corner of the screen as shown in FIGS. 1 and 2.

FIG. 1 shows an example of an embodiment of the invention, the relationship between David Brewster, the inventor of the kaleidoscope, and Lord Kelvin, who first determined the concept of absolute zero, the relationship being shown using a green line connecting the two individuals' sphere surfaces and the relationship being that of 'worked with'. Other relationships of David Brewster are also shown with other individuals, for example with Sanderson and with McPherson, the relationship being displayed using a yellow line connecting the individuals' sphere surfaces.

Figure 2:
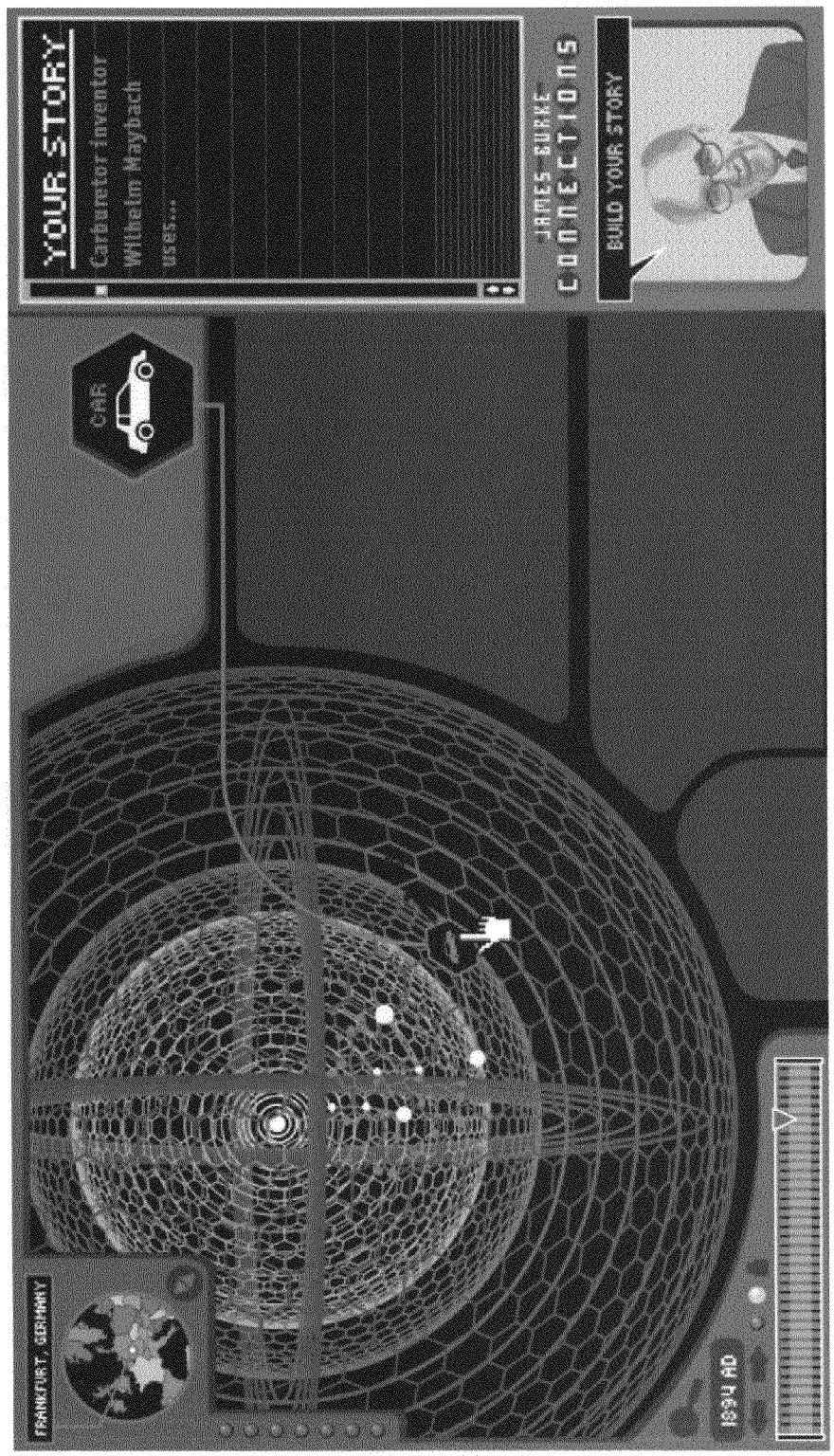
FIG. 2 is an exemplary embodiment of a GUI visually representing data objects associated with nested globes.

FIG. 2 shows another embodiment of the invention, the relationship of individuals in the development of the carburetor. Green lines link the different components of the carburetor according to the individuals who developed each component.

Figure 3:
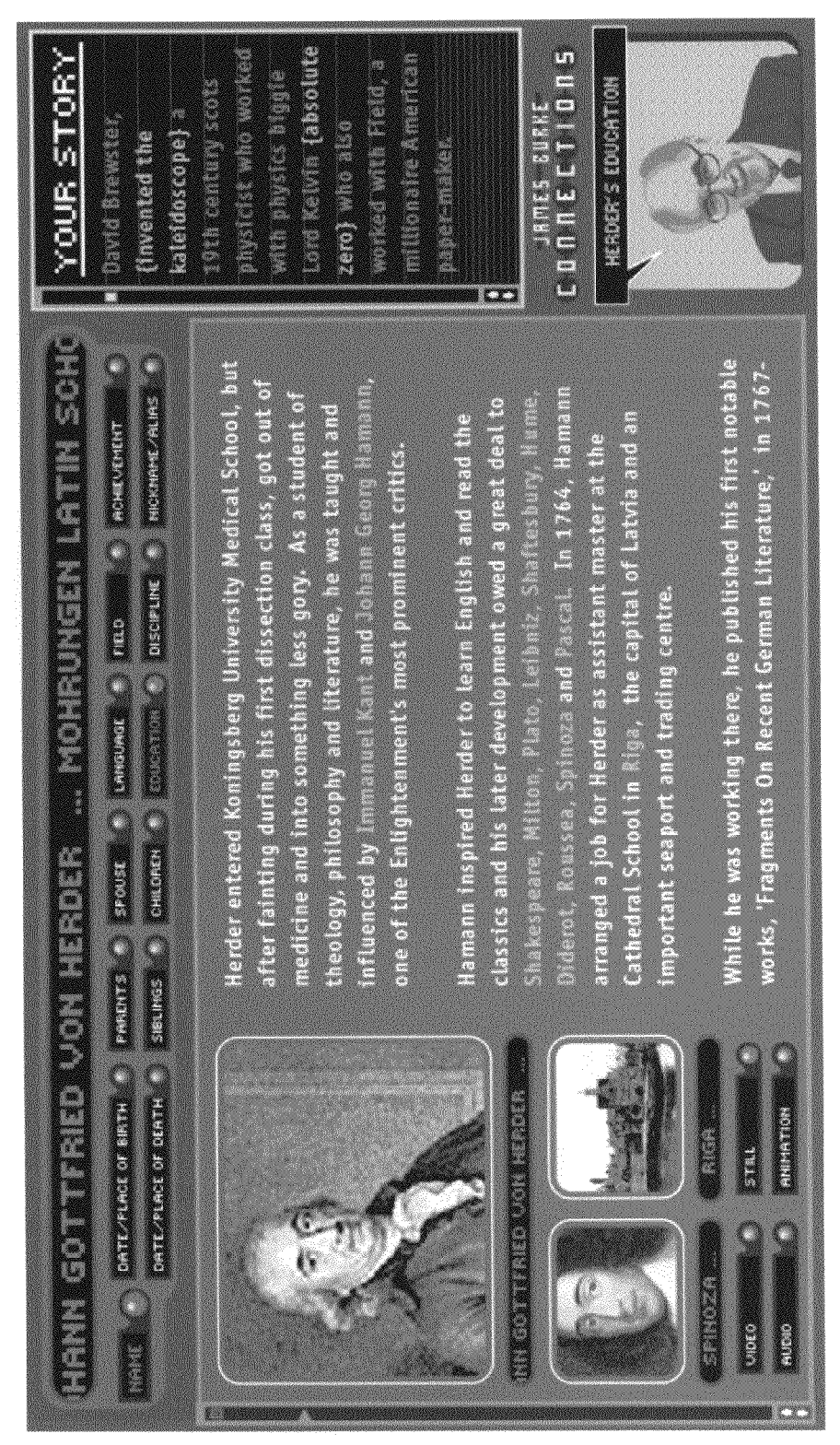

FIG. 3 shows yet another embodiment of the invention, a textual description of the relationships between Johann Gottfried von Herder (philosopher, critic, and poet of the late Enlightenment) and his teachers, mentors, and the influences of major contributors to literature and philosophy on von Herder's own work.

Figure 4:
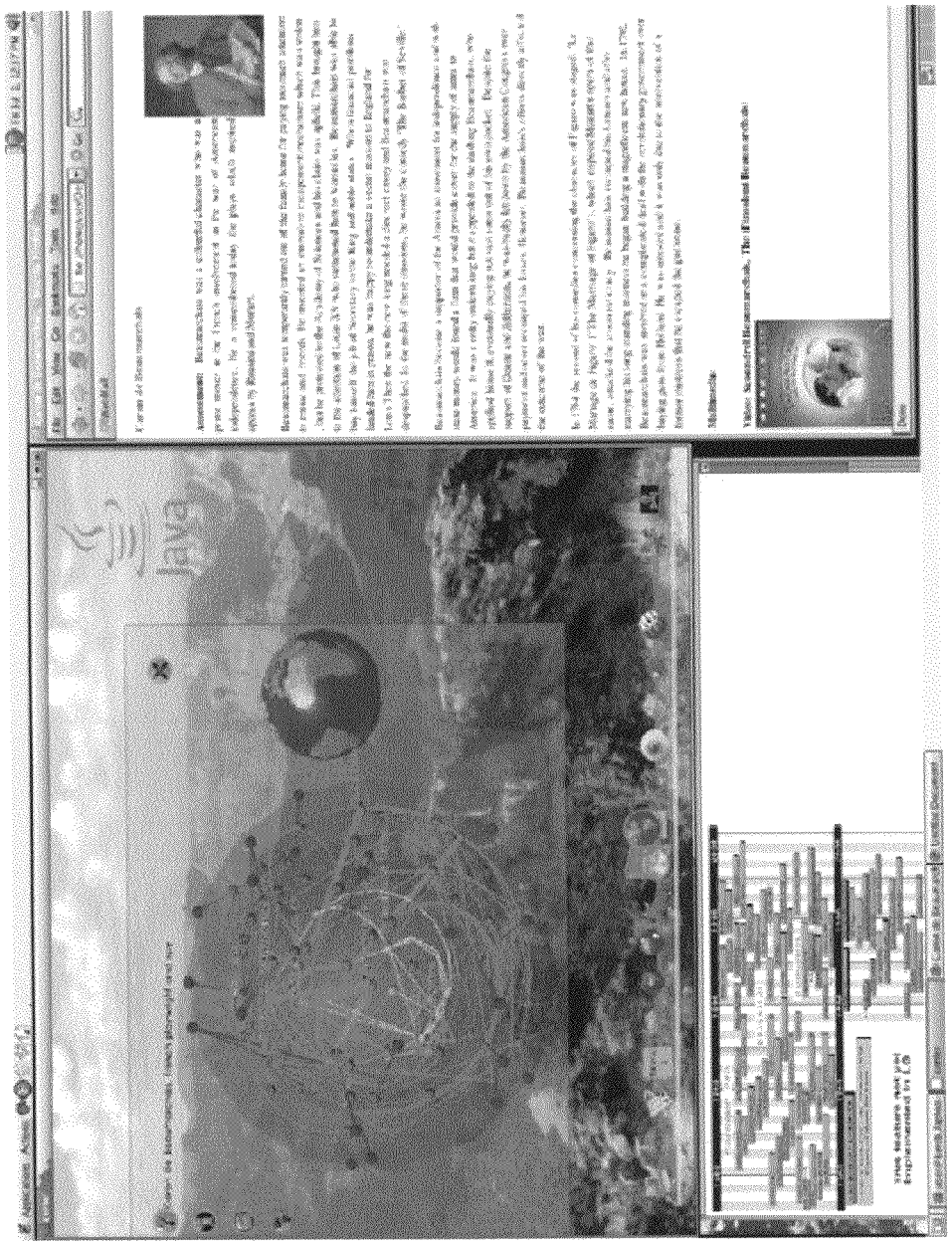
FIG. 4 is another exemplary embodiment of a GUI showing representations of the sphere, nodes, lines, a globe, a timeline, and a record retrieved from a database.

FIG. 4 shows an alternative embodiment of the invention, an interconnected plurality of nodes and lines upon the surfaces of virtual spheres, a globe icon representing the Earth at a particular time point, a series of tool and icons set in a bar that provide hyperlinks to other resources, a timebar comprising a number of timelines of events and people, and a report describing a person of interest, in this case Caron de Beaumarchais (1732-1799).

Figure 5:
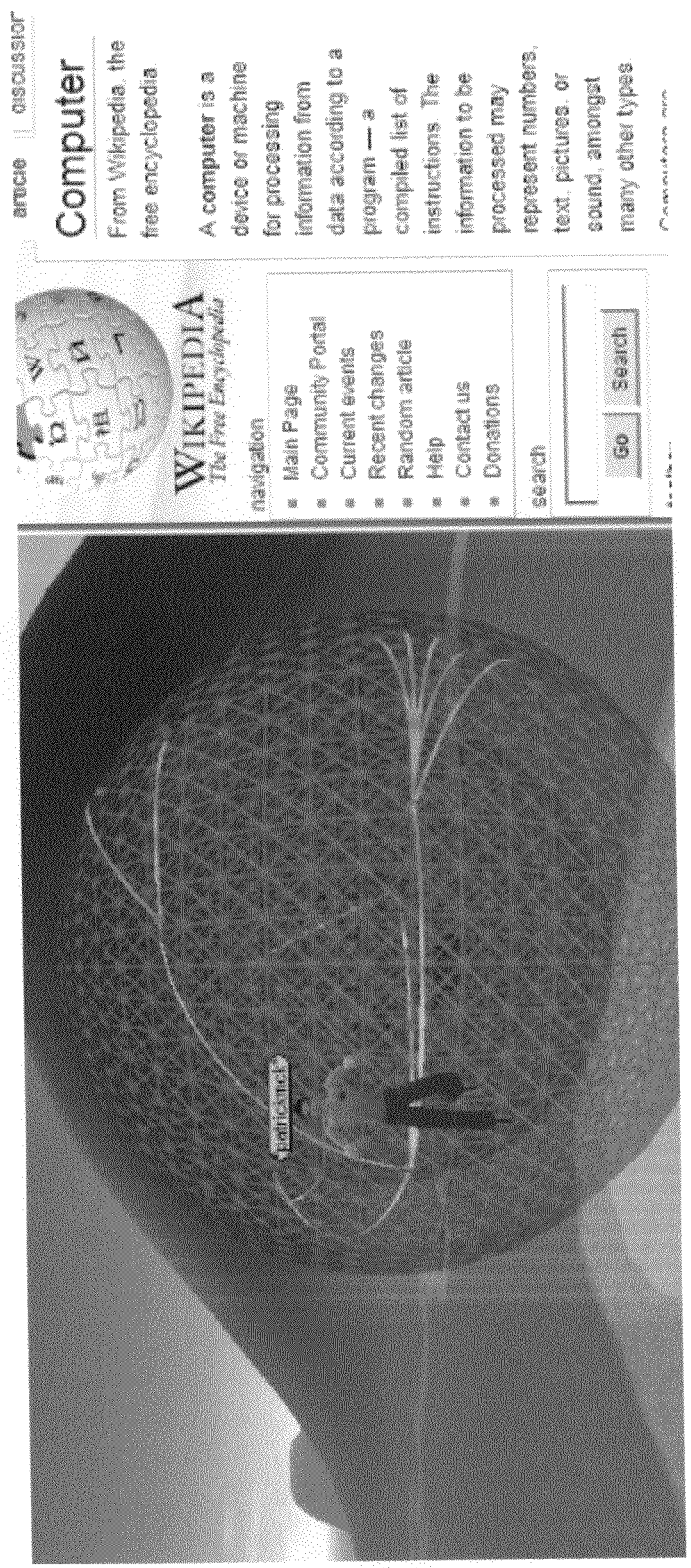
FIG. 5 illustrates another exemplary embodiment of a GUI further showing a number of nested spheres, a number of nodes connected by lines, a user avatar, and a link to a user-community forum.

FIG. 5 shows another embodiment of the invention, a set of nested spheres comprising a plurality of nodes, and wherein some of the nodes are linked by lines in parallel or in series to other nodes by virtue of being associated with the user avatar "patrickmck". The nested spheres in this case represent the surface of the Earth at different time points, the outermost sphere representing the present day and the inner spheres representing time points in the past. In particular, FIG. 5 shows that although the nodes are separated by distances of various lengths over the surface of the Earth as well as between the surfaces of the Earth at different time periods, they are connected by having association with "patrickmck". In addition the GUI comprises a sidebar comprising a link to the user-community forum Wikipedia.

Each of the five Figures disclosed shows an image of an embodiment of the invention. Other embodiments may include pictographic representations of components of a system, graphic representations of data, audio-visual display of data, and the like.

K-Web content may, as one example, comprise several thousand illustrated biographies of key individuals from Western or other culture, encompassing science and technology and the humanities. The data exist in the form of several thousand biographical "nodes", or data objects, located on an interlinked network. Each individual's "node" is connected in some way (work, family, association, cooperation, influences, etc.) with one or more others. In this way, the nodes are linked by many thousands of connections. In one embodiment of the present invention the number of nodes and connections is not limited. An optional aim of the K-Web is to present knowledge in an integrated, multi-layered, holistic way. For example, Newton and his science works are seen in context and related to 1) earlier scientific knowledge, 2) Newton's contemporaries, and 3) those later scientists who built on his work. Newton's personal relationships are also shown, as are the individuals and areas of research he influenced. Each such individual may sit at the center of a web of relationships, both personal and discipline-related. Each individual's web is in turn connected to those of others. In this way, all data on the K-Web may be ultimately linked to all other data. In final form, software may present the web on-screen as a shape-changing structure, formed of nodes and connections much like a dynamic, interactive web in space and time.

A user may move through the knowledge space. At any point on a journey, the user is at a node, surrounded by a constellation of its connections. Given the number of nodes and larger number of connections the number of potential pathways through the web is large enough for curriculum purposes. Each time a node is selected, a summary of the chosen individual appears on the screen, inset into a view of the relevant local sector of the web, for example, "David Brewster, a Scots crystallographer, invented the kaleidoscope, and . . . ". Moving to one of this node's connections causes the local web to change shape, presenting the next node, at the center of its own mini-web, with its summary, linked to the previous one, and so on. As the journey progresses from node to node, a sequence of linked, summaries builds, so that at the end of the journey the user has created a skeleton storyline of summaries describing the journey. This text summary can be then modified, expanded, amplified, and embellished using the full biographical text, pictures, sound, video, animations, virtual reality, or maps contained in each node. Node biographical texts also include hyperlinks to other nodes, as well as to online dictionaries, encyclopedia entries, bibliographies, and maps of places of interest mentioned in the text.

The present invention enables a user to manipulate a first data object onto and into a second data object, whereby the connections found between first and second data objects are determined. These identified connections are then presented to the user as relevant facts, suppositions, inferences, suspicions, assumptions, beliefs, deductions, or possibilities.

The K-Web also may offer a "where am I?" navigation tool, a diagram-history of saved links, and maps showing relevant locations (which can be hyper-linked to external sources). The K-web offers various modes of access (for the user to start a journey), including (but not limited to):

- Any natural language question (for example, "Where did the airplane originate?" or "How did Baroque Art begin?") triggers the appearance of the relevant mini-web, with the key subject node at center, surrounded by a constellation of connected nodes, and a constellation of other connected nodes.
- A scrollable alphabetic list of names or topics.
- A time-bar control for access by date and period.
- A choice tool for access by criterion (such as nationality, profession etc.).
- A box for "user-selected journey" access (for example, "Navigate me from x to y").
- Thematic subject selection: such as, for example, The Industrial Revolution, an invention, a social development, an event, etc. (for example, "Who were the key players in the Enlightenment, in powered flight, in chemotherapy, etc?").
- Start-point selection by user (for example, user selection of any node)
- Random or predesignated journeys. In one example, the K-Web might be accompanied by a Teacher's Guide to be used in an educational environment. The Teacher's Guide might include information and capabilities such as:
- explanations about and instructions for using a Teacher Login screen and menu;
- means to post homework assignments;
- means to post corrected or graded homework assignments;
- means to empower or authorize students or users to add content to their own personalized "mini-K-Web site"; and
- means to upgrade postings through an editorial or fact-checking utility.

Other modes of access may include voice-recognition software; on-screen keyboard input systems; other input systems; and the like.

Other means used to display an embodiment of the present invention include, but are not limited to, hand-held personal computer devices, hand-held personal computer game devices, to wrist-attached personal computer devices, personal computer devices attached by other means, virtual reality systems, tactile systems, such as Braille mechanical technology, and other means of sensory connection with a user.

Examples

The invention will be more readily understood by reference to the following examples, which are included merely for purposes of illustration of certain aspects and embodiments of the present invention and not as limitations.

I. Graphical User Interface and Knowledge Web (I)

Over 1,800 fully edited node texts (approx. 1.5 million edited words) were researched and written. Artists' impressions of the look of the on-screen web were developed (see FIGS. 1 through 3).

The opening homepage title screen included a one-time log-in box for name/email address/password. It dissolved to show:

A. General View on Screen

1. Filling the left half of the screen, a general view of the web globe, rotating slowly.
2. At bottom right, inset, a help avatar.
3. At top right: Start your journey (click using mouse tool for options).
   A click by the user opened the following: Search by . . . <Name><Nationality/Profession><Period/date>.
   User made a connection between [x] and [y].
   User asked any question to offer end-user a pre-designated pathway.
   User selected a start point in the modern world.
4. At top left, inset, a turning geographical Earth globe image.
5. At bottom of screen, below the web, a turn/zoom web-control.

Notes:

1. In this example, the web appeared as a three-dimensional globular stellar cluster, against the darkness, turning slowly and filled with star-like points of light. These points of light were the nodes. Fine filament lines (less bright than, or of a different color from, the nodes) gave the impression that all the nodes are interconnected. The center of the web globe was the past. The outer surface of the web was the world of the present time. Nodes were distributed in space according to their century or time period. Centuries were layered, from the center/past out to the surface/present, like the layers of an onion. Nodes were positioned as near as possible to other nodes, with which they have first-level connections, so century layers are populated by clusters of nodes. The demarcations between the layers were not visible. Layers were visible (a) by the location, within them, of all nodes belonging to that century, and (b) by the lattice-like structure of the filaments connecting these nodes.

2. The avatar may always or occasionally be present on the screen (unless made to disappear by user) and provides a Help function. When selected, the avatar showed a dialog box in which to enter questions about how to use the web. The avatar may respond in mechanical audio/voice and print. In an alternative example, the avatar may be viewed as a three-dimensional representation and may respond in a video format. In another alternative embodiment, the avatar may be displayed in virtual reality. In an alternative embodiment the avatar can represent different people from history (for example, Charlemange, or Josef Stalin), people from different disciplinary fields (for example, Charles Darwin, Francis Galton, or Charles Lyell), or people from fiction that are fictional characters representing a particular point of view or way of thinking (for example, K in "The Castle" by Franz Kafka, Uncle Tom in "Uncle Tom's Cabin" by Harriet Beecher Stowe, or Richard Hannay in the thrillers by John Buchan).

3. Access Modes:

Names Selection causes scrollable alphabetic list of all names to appear. Selecting a name causes the relevant node on the general web to become brighter or highlighted (by intensity- or differentiated-differentiated). Zooming into the web started and then warped (the view dissolved to become the mini-web [see below], centered on the selected node, displayed with its first-level connections and their first-level connections).

Nationality/Profession Selection caused two rotatable pencil-shaped images to appear top right of screen, each facet carrying a designation and with up/down arrow controls next to each pencil. To select, pencils were rotated using arrows, and then clicked using mouse device. At selection, drop-down name-list(s) appeared below each pencil. Highlight and select a name from list causes zoom-to-mini-web process to start.

Period/Date Selection caused time-bar to appear on the screen with date and period control. Selecting a date highlighted all nodes relevant to that date and resulted in a scrollable alphabetic list of names, each with a brief note (for example, "James Watt born"). Selecting a time period highlighted all relevant nodes and resulted in a scrollable alphabetic list of names and relevant descriptors (for example, "James Watt: steam-engine"; "Napoleon: Egypt invasion").

The time display/timeline also shows events and objects, some of which are represented by images and/or icons. Selecting an object and then clicking on globe creates a globe or map that shows instances of occurrence and a geographical representation of the object. Using start and ending point on time slider, a video animation of the change in distribution of these artifacts is displayed (this can be saved and transmitted). Moreover, two objects or other entities can be selected and juxtaposed (for example, Paul's travels and the spread of Christianity, or cell phones and micro-entrepreneurial activity). In addition, time display can be stratified as in W. Stein's Kulturfahrplan. The timeline can be used in conjunction with other input/filter devices, for example, professions (as described elsewhere herein).

Referring now generally to the Figures and particularly to FIG. 1, the visual representation of the globe on the screen may be changed by rotating or otherwise manipulating a globe icon by means of a graphical user interface control as presented in the upper left hand corner of FIG. 1. The user may, by using a mouse, move the cursor to a directional control in the graphical user interface control, as located to the lower right of the globe icon shown in FIG. 1. The user may thereby instruct the K-Web software to rotate or otherwise move the displayed representations of the globe icon and/or the K-Web database. The globe icon and directional control may thereby be used as method of directing, implementing, controlling, enabling or using the data filter and/or data selection functions or commands of the present invention.

If a user makes a connection between [x] and [y], a click of the mouse may highlight nodes x and y, as do other intermediary relevant nodes and connecting lines. Zoom-in starts and centers on the x-node of the mini-web. The user may ask any question. For example, "Who invented /did/wrote/built/fought . . . ?, where did /when did . . . ?, what was the effect of . . . ?, what were the origins of . . . ?". The "theme" example of access: for example, "Who were the key figures of the Industrial Revolution?". Relevant nodes on the web are highlighted and the GUI image zooms to mini-web screen.

If the user selects a pre-designated pathway, the first and last nodes and all intermediate nodes are highlighted. User can zoom in to first node and its mini-web, with the next connection highlighted (this happens each time the user selects the next node). User can select a start-point in the modern world and click reveals drop-down, scrollable list of modern entities (for example, airplane, sociology, ice cream, rock and roll, British Museum, calculus, anthropology, etc.). User selection highlighted relevant node on web surface. User zoom-in-to-mini-web ends with the relevant node at the approximate center of its connections.

B. Mini-Web Screen

Notes: Each zoom-in ends to reveal a mini-web filling one side of the screen, as shown in FIG. 2: the selected primary node is in the center, with connecting filaments linking it to its first-level connected nodes and, in turn, to their first-level connections [for example, the thematic version of the mini-web would show the theme node (for example, The Industrial Revolution, Baroque art, Romantic philosophy, steam-power, etc) centered, and connections from it to:

- any relevant illustration nodes (example of the art or literature, architecture, technology, etc), also hyperlinked to an encyclopedia article on the theme;
- the connected key node-names for this theme (and their first-level connections). User click on any connection filament caused the connection descriptor phrase ("married", "worked with," "influenced", "employed," etc.) to appear over the cursor. User click on any connected node and the K-Web image may reshape to show the newly selected node at the center, surrounded by its first-level connections (and theirs). Each time a new node is selected, the turning geographic Earth-map at screen top left stops, with relevant locations marked. User may click to enlarge or reduce size of Earth-map. User click on any marked location to hyperlink to relevant location information source. On screen right (filling about 25% of viewable screen) is a narrative, entitled, for example, "My Story" box (see FIGS. 1 and 2; "YOUR STORY").

This narrative may be one result of the web journeys.

As any mini-web is opened for the first time, the box can add a short text descriptor relating to the central node (for example, "James Watt, developer of the steam engine . . . "). This descriptor can change after the next connection (for example, if Matthew Boulton were chosen, the descriptor then reads: "James Watt, developer of the steam engine, in business with . . . " followed by Matthew Boulton's descriptor). If the user decides to backtrack by one or more connections and then to resume in a different direction, the relevant descriptors are removed from the display and are added to, the "My Story"/"My Journey Throughout" box. In this way an outline description of the web journey is gradually built up, available for expansion or modification later by reference to the full node biographical and data texts (see below). As the journey progresses a scrollable list also builds on the screen, showing the list of previously-selected node-names, each linked by a brief connector description. Should reselection occur, this list is updated. The list informs the user where they are, and where they have been, for example, "Watt, helped by Black (colleague of Cullen), taught Graham, who employed Emma Hamilton (mistress of Admiral Nelson), etc.". This list alters in relation to the user's decision, for example, to return to an earlier node and take an alternate pathway.

C. Node Text:

The node biography text was opened by double-clicking or right-clicking on a node symbol. The text box can fill the screen or be downsized, as shown in FIG. 3. It can be the basic information resource of the K-Web. The node-text included:

- basic demographic data (name, date of birth, profession, achievement, etc),
- a brief (for example a one-thousand word) biography
- still images (click on any name, word, or title in text to see relevant picture)
- video clips
- music/speech audio clips
- animations
- drawings and maps bibliography (for example, user click on any literary reference in text or bibliography title to hyperlink to bookseller or relevant local library information)

The biography text may contain hyperlinked names of connected nodes. User can click on these and jump to the relevant other mini-web, with the chosen new name-node at center. User can click on any word in the text to hyperlink to dictionary definition, or on any descriptive term (for example, "Industrial Revolution") to go to the relevant encyclopedia entry. User can click on place-name and hyperlink to relevant location agency and/or other geographical information source.

An Example Node Text is:
(* indicates in-web links; ** indicates link to external source):
NAME: Shelley, Mary Wollstonecraft
ACHIEVEMENTS: Author of: "Frankenstein"
NICKNAME/ALIAS: None
DATE AND PLACE OF BIRTH: 30 Aug. 1797, London**, England
DATE AND PLACE OF DEATH AND AGE AT DEATH: 1 Feb. 1851, London, England. Aged 54
DISCIPLINE: Writer FIELD: Literature LANGUAGE: English
PARENTS: Father: William Godwin
CR OR PUNCT Mother: Mary Wollstonecraft
SIBLINGS: None
SPOUSE: Percy Bysshe Shelley
CHILDREN: 1 surviving son: Percy Florence Shelley
EDUCATION: Privately at home
MAJOR WORK: "Frankenstein" (1818)
LIFE AND TIMES: During her childhood Mary, whose mother Mary Wollstonecraft* had died when she was an infant, was educated by her father, William Godwin*, and became familiar with the literary and radical group around him, which included the poet Samuel Coleridge*, the writers Charles Lamb* and William Hazlitt*, and the scientist Humphry Davy*. When she returned from a long visit to Scotland in 1814 at the age of seventeen, the Romantic poet Percy Bysshe Shelley* and his wife had also become frequent visitors. In July 1814 Mary and Shelley eloped, accompanied by Mary's stepsister, Claire Clairmont. After some weeks traveling in France and Switzerland they returned to England**, where they lived almost penniless. They began an intensive course of reading together, and Shelley introduced Mary to English and German literature, the French writers Voltaire*, Rousseau* and Madame de Stael*, as well as history, politics and the ancient Greek and Roman writers**.

Mary gave birth to a son, and in the summer of 1816 they took a house above Lake Geneva* near where Byron* was staying. One evening at Byron's villa** it was decided they would each write a ghost story. Mary wrote "Frankenstein".* At the end of the year Shelley's first wife committed suicide and he and Mary married. In 1817 they settled at Marlow** on the River Thames* and Mary turned "Frankenstein" into a novel, consulting Davy's chemistry is lectures** to give authenticity to her story about a scientist who creates life and then cannot control the creature he has made. The novel was published the following year and was immediately recognized as something new. She later said that her imagination had originally been stimulated by Byron and Shelley's conversations on science in which they discussed the experiments of Erasmus Darwin*, the eminent English physician and scientist. Mary was particularly struck by a story about a preserved piece of vermicelli that "came to life."

In 1818 the Shelleys left for Italy, in an attempt to escape Shelley's creditors and to improve his health. In the course of the next year, both their children died and Mary entered a period of depression. In the summer of 1819 they moved from Rome to Livorno and Mary wrote a short novel entitled "Matilda" about an incestuous father. In November, in Florence, she gave birth to a son, Percy. In 1820 they moved to Pisa*, where they lived with a circle of English expatriates, and in June 1822 they took a house with friends in an isolated fishing village on the nearby Bay of Lerici**. In July, Shelley's boat capsized and he drowned. Mary remained in Italy for some months with the publisher and critic Leigh Hunt* and his wife.

In 1823 she returned to London where she found that "Frankenstein" had been staged, and her father brought out a new edition of the novel. Mary lived a rather restricted and lonely life, since her elopement with Shelley had alienated her from most of society. She continued to write, and her novel "The Last Man"* (1826), about an epidemic which destroys the human race, is considered by many as her best novel. Through her friendship with Frances Wright*, a wealthy radical who worked for the anti-slavery movement, Mary was asked to join a utopian community at Nashoba on the Tennessee frontier. She had no wish to do so and was able to use her young son as an excuse, but during the discussions she became friendly with Robert Dale Owen*, one of the Nashoba colonists.

In 1828 she visited Paris* where she attracted the rising young French writer Prosper Merimee*. In 1830 she published her historical novel "Perkin Warbeck". She failed to interest the publisher John Murray* in a book on Madame de Stael* and turned instead to contributing a series of biographical and critical essays* on European writers for an encyclopaedia. In 1832, in order to be near her son's school she moved out of London to Harrow. In 1835 she published "Lodore" which was a success, but she was lonely at Harrow and moved back to London when her son finished school in 1836. She published "Falkner", her last novel, in 1837. In the same year she moved to Putney, just outside London, and began to prepare a selection of Shelley's work for publication. The edited versions of Shelley's "Poetical Works" and "Prose Works" came out in 1839-40. Mary's editorial contribution is considered to be among her best work. She also revised and published the travel book: "History of a Six Weeks' Tour," which she and Shelley had written about their first travels round Europe.

Her son now received an adequate allowance from the Shelley estate and in 1840 Mary accompanied him and his friends on a tour to Germany, Switzerland and Italy. She published an account of this trip and a subsequent yearlong tour in 1842-3 in "Rambles in Germany and Italy". From 1848 she lived with her son and his wife in London, and on his small estate. She suffered a stroke in 1851.
ASSESSMENT: Mary Shelley was an intellectual and radical, remembered as Shelley's wife and as the author of "Frankenstein."
EXTRA CONNECTIONS: None
BIBLIOGRAPHY: Spark, Muriel, Mary Shelley*, Constable & Co., Ltd., London, 1988 Sunstein, Emily, Mary Shelley, Romance and Reality*, John Hopkins University Press, Baltimore, 1989
STILLS* (Pictures of all persons referred to, as well as places)
AUDIO* (This might include a reading from "Perkin Warbeck")
VIDEO* (This might include a clip from the film version of "Frankenstein")
ANIMATION* CARR RET
N/A DRAWING*

N/A Endit. DEL

II. Graphical User Interface and Knowledge Web (II)

An additional example of a typical K-Web pathway illustrating the simplest kind of interdisciplinary sequence is described.

James Watt (mechanic)>who worked with>Boulton (businessman)>who worked for>Adam (architect)>who learned from>Winckelmann (art history)>who fell for>Kauffmann (paintress)>who painted>Garrick (actor)>who put in his theater the lamp designed by>Argand (wine-maker)>who got development funding from>Necker (French politician) >whose daughter was>De Stael (Romantic author)>who seduced>Schlegel (philosopher)>who was the pal of>Herder (teacher)>who started>the Romantic Movement (ideology) >to inspired by>the third-century Celtic poem Ossian (fake) >really written by>McPherson (antiquarian)>whose daughter married>Brewster (inventor, kaleidoscope)>who worked with>Marie Curie (discoverer of radioactivity)>whose lover>Paul Langevin (physicist)>invented>(chemical warfare/disarmament).

Each node on the K-web also can connect with at least twenty other nodes. It is possible to enter the web and follow connections, without repeating the same track, many thousands of times over. One aim of the K-web is to show the way in which all knowledge is connected to all other knowledge.

Educational Uses

In the classroom, teachers might choose to indicate a target or number of targets for students to find or connect, and then have the students describe the route they took. Students might be also asked to design their own connections. Used as a teaching tool, the K-Web can serve to introduce university students to their chosen major/minor degree subject by putting the subjects in their true interdisciplinary context. In such a situation, students can be required to "travel" to their specialist subject area a number of times. These journeys would serve to show the relevance of their subject to other disciplines and help to enrich their understanding of the subject. Used in this way, the K-Web can also serve, for example, as an updated version of the present Western Civics college freshman source. The K-Web would also aid teachers in high school to enliven curriculum course material, and to give students a different view of the way in which learning can be done. The K-Web can also prove attractive to parents as a kind of "game" version of encyclopedias, given added value by its interactive nature and by the fact that users can, in one version, add their own connections to the K-Web, or build their own personal, class, to or community webs.

The principal use for the nested-sphere construct (or selected-date/period sphere) is to permit the user to virtually fly into, and interact with, the construct. Once inside, flying through and round (changing direction is possible) causes nodes to come close, revealing themselves as names, so the user feels they are flying through the interconnected 'cosmos' of node names. The impression should be of flying through a dense star-cluster. The only use for this K-Web entry-option is when a user decides to start The Journey with a random choice of node, or to look around.

Stopping at a node causes the onion skins for all other centuries, nodes and connections, to dim down, then changes shape to a view of the chosen (brightened) node and its constellation of connections (out to third-level connections: in TheBrain style; TheBrain GUI display style is disclosed at world wide web (www) University of California (people.ucsc) education (edu) site with page address: "~.pmmckerc/bdvizeg.htm"), curved over the surface of the "onion skin". This is a transitional phase to hint at density, and immediately morphs to become a node+first+second-level-connection, two-dimensional view (in TheBrain style) of:

A. Miniweb of Chosen Node+First+Second-Level Connections (If in TheBrain style, nodes are names).

(If TheBrain software is used for this mode, the need is to differentiate "chosen" nodes from first- and second-level connected nodes. If node name is in silver, selection as chosen node causes it to become subtly colored)

In mini-web mode:

(a) user mousing over the chosen node causes the node's descriptor temporarily to appear by that node and in The Journey space (b) user mousing over the link filament causes the linking descriptor phrase temporarily to appear by the link-filament and in The Journey space, below the descriptor (c) user mousing a connected node causes its descriptor of each node temporarily to appear by that node, and also below the linking descriptor phrase in The Journey space.

User clicking on any node causes the mini-web view to fade to faint (i.e. become the background) and the selected node's bio-text appears.

User clicking on the Miniweb icon in the bio-text margin (as disclosed below) returns the user to the relevant Miniweb view.

i. Topographic/Cartographic Globe-Map

This is activated once the user is in Miniweb mode. Relevant to the node moused-over or clicked, it automatically shows continent-scale view (real topography+geographic data superimposed), highlighting the specific country involved.

User clicking on the Earth-globe construct causes it to be highlighted.

Further right- or left-clicking moves it to next zoomed-in/out levels of magnification (Earth>continent>country>location).

User clicking on a location name or spot jumps user to online resource. Closing link with this resource returns the user to the screen as it was before the resource use.

Period maps may also be accessed by user.

ii Screen-Edge Icons/Entry Modes

1) Back and Forward Arrow Icons.

2) Entry Via Timebar/Nested Sphere Construct.

Timebar has button ('Timescale') at one end which, when clicked, changes timebar increments from centuries to decades to years (i.e. it changes timescale).

User mousing over either end of timebar scrolls it left (time period numbers move out of sight to right, moving the period shown back in time) or right (time period bar moves out of sight to left, moving the period shown forward in time). Remove mouse: time-period shifting stops. User choice can also be made of a user-chosen time-period.

User click on command button at end of bar to input choice of time period or date.

Appropriate response: choice of time-period or date causes nested-sphere construct to morph into a single sphere, populated by relevant nodes and links. User can then "fly" through the sphere and choose a node (see above)

3) Entry by Natural Language

User mouse on screen-edge icon "Command/Question" causes the icon to become highlighted and the cursor to move to the beginning of the space where the user's typed letters will appear (in center of screen, as background is dimmed).

User enters a natural language sentence or phrase (for example, (i) "Who invented the steam engine?" (ii) "What was the origin of the carburetor?" (iii) "Show me all eighteenth century German chemists").

Appropriate response in miniweb mode: for example
(a) James Watt and first-level connections, with relevant node/links highlighted;
(b) Maybach and first-level connections, with relevant nodes/links highlighted;
(c) Appropriate response in listing view: e.g. dropdown list of all relevant chemists.
Other possible inputs and actions can be available.

4) Entry by Alphabetic Choice.

User mouse on screen-edge icon "Contents" and dropdown menu of alphabetic list of all node-names appears, in center of screen, in faint lettering, which brightens as mouse goes over, and scrolls up or down as mouse reaches small line indicating top/bottom.

User scroll and click to choose icon.
This Result Appears:
Miniweb with chosen node at center of constellation (node+first+second-level connections) in TheBrain style (see also Miniweb/The Journey).

5) Entry by Categories/Vital Statistics.

Among the screen-edge icons, five icons: (i) "Category" (ii) Discipline" (iii) "Field" (iv) "Other" and (v) "Filter".

(a) User mouse over "Category" icon and subset of icons appears (taking the place of "Category"): "Person" "Thing" "Event" "Concept"
User click on one of the four sub-set icons, to choose.
Dropdown alphabet list of relevant node names appears.
User scroll and click to choose.
Miniweb appears with chosen node at center of constellation (node+first+second-level connections) in TheBrain style (see also Miniweb/The Journey).

(b) User mouse over "Discipline" icon, and it is replaced by dropdown alphabet list of disciplines.
User scroll and click to choose.
Dropdown alphabet list of relevant node names appears.
User scroll and click to choose.
Miniweb appears with chosen node at center of constellation (node+first+second-level connections) in TheBrain style (see also Miniweb/The Journey).

(c) User mouse over "Field" icon, and it is replaced by dropdown alphabet list of fields.
User scroll and click to choose.
Dropdown list of relevant node names appears.
User scroll and click to choose.
Miniweb appears with chosen node at center of constellation. (node+first+second-level connections) in TheBrain style (see also Miniweb/The Journey).

(d) User mouse over "Other" icon, and it is replaced by
Set of headings: 'nationality,' 'gender,' 'place,' 'ethnicity,' 'century,' 'date' and 'process choice'
User click on heading of choice.
A relevant dropdown list(s) (e.g. countries, M/F, national group, centuries, years) appears.
User scroll and click on relevant list(s).
User click on 'process choice' command
Filtered dropdown list of relevant node names
User scroll and click to choose node
Miniweb appears with chosen node at center of constellation (node+first+second-level connections) in TheBrain style (see also Miniweb/The Journey).

(e) In "Person" mode, a filtered choice can be made:
User click on "Filter."
"Discipline," "Field, and "Other" become highlighted.
User click in sequence on those chosen, e.g. "Discipline."
A dropdown list of disciplines appears.
User click on chosen discipline and a dropdown list of all relevant node names appears and remains.

User click on "Field" and a dropdown list of Fields appears. Click on chosen field and the present list of "Discipline" node names is reduced to those relevant.
User click on "Other" and a dropdown list of other categories (nationality, gender, place, century, date) appears.
User click on chosen category(ies) [nationality, gender, place, century, date] and the dropdown list of already-filtered "Discipline/Field" node names is reduced to those relevant.
User scroll and click on chosen node name.
Miniweb appears with chosen node at center of constellation (node+first+second-level connections) in TheBrain style (see also Miniweb/The Journey).

6) Entry by Keyword.

User click on screen-edge "Keyword search" icon.
Cursor appears at typing space.
User enters key word.
Dropdown list of relevant nodes.
User scroll and click to choose
Miniweb appears with chosen node at center of constellation (node+first+second-level connections) in TheBrain style (see also Miniweb/The Journey).

7) Entry by Theme

User click on screen-edge "Theme" icon, and it is replaced by dropdown list of themes available (for example, The Industrial revolution, Quantum Physics, Renaissance art, etc.)
User scroll and click to choose.
Miniweb appears with chosen node at center of constellation (node+first+second-level connections) in TheBrain style (see also Miniweb/The Journey).

8) Entry by Preselected Journey

User click on screen-edge "Default Journeys" icon and it is replaced by dropdown list of available pre-selected journey choices (for example Copernicus to chewing gum). Preselected journeys can be available.
User scroll and click to choose.
The first miniweb screen shows the first node+first–level node highlighted (relevant descriptor and linking descriptor phrase appear in "The Journey" space).
Each time the user clicks on the next node, it becomes central, when relevant node+first–level connections are highlighted, and The Journey text is updated (see below).
On arrival at the final node of the pre-selected Journey, no further highlighting occurs.

9) Entry by Personal Selection of Journey

User click on screen-edge "Select Journey" icon that is replaced by two headings ("From" and "To") and two identical dropdown alphabet list of all nodes, one below each heading.
User scroll and click on choice from each list.
The miniweb screen shows the first node+link+second-level node highlighted (relevant descriptor and linking descriptor phrase appear in "The Journey" space).
Each time the user clicks on the next node, it becomes central, when relevant node+first–level node are highlighted, and The Journey text is updated (see below).
On arrival at the final node of the selected Journey, no further highlighting occurs.

10) Entry by Random Choice

User click on screen-edge "Random Choice" icon
Miniweb appears with randomly-chosen node at center of constellation (node+first+second-level connections) in TheBrain style (see also Miniweb/The Journey).

11) Entry by Modern Gateway

User click on screen-edge "Gateway" icon
Dropdown list of gateways appears

User scroll and click to choose

Miniweb appears with chosen node at center of constellation (node+first+second-level connections) in TheBrain style (see also Miniweb/The Journey)

iii Node Bio-Text and Other Node Properties

There can be three kinds of node, with different-format texts:

a) "gateway" nodes (i.e. modern-world element, such as chewing gum or atom bomb). These are simple one- or two-paragraph descriptions.

b) "thing," "event," or "concept" nodes. These include basic data (date, location, etc) and narrative.

c) "people" nodes. Text can begin with the subject's vital statistics (date of birth, family, etc), followed by bio-text life-and-times narrative, followed by Bibliography and extra-option icons (see below)

Each bio-text can occupy a space filling left ⅔ of screen. When it appears, the node's descriptor can appear in The Journey space (see below).

When user mouses-over any location reference in the text, the map (see above) shows relevant-sized view with relevant location highlighted.

Each text can begin with a top-center still (for example, node-subject portrait, relevant art work, illustration, music playing in audio mode etc.) with the node name superimposed.

Names of hyperlinked names (of other K-Web subjects) in the bio-text can be highlighted.

User click on hyperlinked name/word and jump to relevant K-web bio-text, or to relevant online resource (including dictionary, tourism website for a location, encyclopedia, etc.)

User mouse over K-web connected name in bio-text, and see pop-up text of that subject's relevant descriptor.

In left margin of text, icons:—

(i) used with highlight text selection to search information (about a bio-text word, or name) via online resource (dictionary, encyclopedias, thesaurus, translations)

(ii) to go to online search engine, such as GOOGLE search engine (iii) to access online partner site(s) (for example National Geographic organization or publisher website, WHOWHATWHEN or PBS websites, etc.)

(iv) Mini-web icon to return to mini-web page view (most recent configuration)

In space following the bio-text narrative:

Audio icon (comprising, for example, run/stop/re-run buttons)

User mouse over icon, see relevant data. User click and hear audio.

Video icon (including animation; comprising, for example, run/stop/re-run buttons).

User mouse over to see relevant data. User click and see or hear video and relevant notes Stills and images icon.

User mouse over to see relevant data. User click and see still(s), images, and relevant notes.

Virtual encounter icon (comprising, for example, run/stop/re-run buttons).

3D Icon

User use with 3D virtual experiences (for example, to visit the place, meet/interact with the people):

Bibliography Icon

User select from list of relevant publications/online resources

User click icon, then on choice, and hyperlink to on-line resource (location of book/book-seller website/article URL, etc.)

All bio-text materials (including audio and visual materials) can be saved for inclusion in 'Archive' (see below).

iv The Journey

This title can sit near the top of the right hand side of the screen and is present at all times. The area can record a basic textual journal of the user's journey.

In either the nested-sphere construct, time-selected single-sphere, or Miniweb view, when a particular node is selected by user clicking, its descriptor appears beneath the "The Journey."

Should the user choose the next node on the journey, the linking descriptor phrase to that node and that node's descriptor both appear in The Journey space, set beneath the previous node descriptor (for example, "Charlie Smith, hot-shot American explorer"), then new line: linking descriptor phrase (e.g. "found Inca ruins with."), then new line: descriptor (for example, "Fred Machin, great American cartographer").

If user decides to choose a different next node (by user clicking a different node in the nested-sphere, time-selected sphere or miniweb, still visible on screen left) the new relevant linking descriptor replace the previously chosen set. In this way, The Journey can be permanently updated.

The Journey (of descriptors and linking phrases) created in this way acts as a basis for later, more detailed work using bio-texts, or as a note-form track of where The Journey has gone, so far.

Node names in The Journey narrative are also hyperlinks, and if user clicked, their relevant bio-text can appears on left of screen.

In this manner, as user builds The Journey, bio-texts can be called up, selected and saved (as can bio-text multimedia contents), together with The Journey note-form narrative, so as to create the user's Journey draft full document, for later editing, etc.

v Help Avatar (can be Turned on or Off)

An example of an avatar is the semi-intelligent reactive and proactive "Wizard" by Steve de Paola of Simon Fraser University (Vancouver, British Columbia, Canada). The avatar can answer queries in voice and/or writing. Unprompted, the avatar may remind, praise, teach, suggest, auto-explain, to user. The design of the avatar can be a semi-translucent hologram head and shoulders of an individual.

vi The GUI can be password-protected and include a teacher guide, lesson plans, and parent-child guides, to provide guided educational means.

vii Saving Journey

User mousing on screen-edge icon 'Archive' can result in it becoming highlit.

User click causes icons such as: 'Name Journey' and 'Save Journey' and 'Retrieve Saved Journey', to appear below 'Archive' (which can become less highlit).

User click 'Name Journey'

Cursor appears below icon, blinking

User enters chosen file-name of Journey to be saved, and user hits Return, or icon: 'Save Journey'

Essential elements saved by this action are:

a) all mini-web pages representing each step in the previously-chosen Journey sequence, each mini-web page with the link to the relevant next node highlighted, and the screen showing relevant ancillary data as previously chosen (map, timebar, multimedia, etc.)

b) the entire Journey textual narrative, with all but the first step dimmed.

viii Retrieving Journey

User mousing on screen-edge icon 'Archive' causes it to brighten

User click causes icons: 'Name Journey' and 'Save Journey' and 'Retrieve Saved Journey' to appear below 'Archive' (which dims)
   User click on 'Retrieve Saved Journey'
   List of Saved Journey file-names appears
   User click on file-name to chose the Saved Journey
   Material Retrieved by this Action:
     a) first mini-web page, and then all mini-web pages representing each step in the previously-chosen The Journey sequence, each mini-web page with the link to the next node highlighted, and the screen showing relevant ancillary data as previously chosen (map, timebar, multimedia, etc.)
     b) the entire The Journey textual narrative, with all but the first step less highlit.

To retrace the saved Journey, in the first mini-web page presented, user can click on the next node (link is already highlighted) and, as this results with the next mini-web page to appear, at the same time the relevant stage of the Journey narrative becomes highlighted. This can be repeated with each new mini-web page. After the last node is selected, no further links are highlighted, and the retraceable sequence ends. 'Journey End' appears superimposed on final mini-web page.

User can at each stage of the retrieved The Journey also investigate bios, hyperlinks etc., as during live work, but can only back each time to the fixed, saved—The Journey sequence.

ix Returning to 'Live' Work after Saving/Retrieving Journey
   User mousing on screen-edge icon 'Close Archive' causes it to become highlighted.
   User click to close all aspects of the Saving or Retrieving process and return to live K-Web.

x E-Mail Facility
   User can email chosen saved The Journeys, or messages to other user or other.

III. Mathematical Models of Inter-Node Relationships

The relationship between two nodes can be determined using the inter-nodal distance in multi-dimensional space as a surrogate for the parameter of the relationship. Node positions are mapped as vectors in at least three-dimensional space, then nodes are clustered as determined using, for example, nearest-neighbor analysis, k-means clustering, or metric space embedding, as described by Giladi et al (2002, supra) and Yona (1999, PhD thesis, Computer Science, Hebrew University, Jerusalem, Israel). In one example, the resulting distance (k or $k^2$) between the two nodes measured in arbitrary units represents the relationship between the two nodes. In a further example, a simple relationship between two nodes or points can be described by a function that includes a parameter or constant that modifies, for example, the square of the distance between the two nodes or points measured in arbitrary units. The relationship can be a function proportional to the square of the distance or to the inverse of the square of the distance.

All references, publications, patent documents, web pages, and other documents cited or mentioned herein are hereby incorporated by reference in their entirety for all purposes. Those skilled in the art will appreciate that various adaptations and modifications of the just-described embodiments can be configured without departing from the scope and spirit of the invention. Other suitable electrical interfacing techniques and methods known in the art can be applied in numerous specific modalities by one skilled in the art and in light of the description of the present invention described herein. Therefore, it is to be understood that the invention may be practiced other than as specifically described herein. The above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

I claim:

1. A computer rendered graphical user interface (GUI) presented at a man-machine interface, the GUI comprising a display of:
   a plurality of nested spherical surfaces, wherein each surface represents a surface of the Earth at a particular time period;
   a plurality of nodes, the plurality of nodes comprising at least one first node and at least one second node, and each node associated with a location on at least one of the plurality of spherical surfaces; and
   a plurality of lines, at least one line having a first endpoint associated with the first node and a second endpoint associated with the second node, and a graphical user interface control.

2. The GUI of claim 1 wherein the surface of the Earth is a representation selected from the Earth's geography and human development.

3. The GUI of claim 1 wherein the most ancient time surface has the smallest radius and is located closest to a shared center point and the most recent time surface has the largest radius from the shared center point.

4. The GUI of claim 1 further comprising a timebar, the timebar displayed in proximity to the nested surfaces.

5. The GUI of claim 2 wherein the representation of the Earth's geography is selected from the group consisting of topography, political units, lines of communication, centers of economic activity, the geology of the underlying and exposed rock, and the tectonic properties of the continental and oceanic plates of the crust.

6. The GUI of claim 1, further comprising a web-control, the web-control displayed in proximity to the nested surfaces.

7. The GUI of claim 6, wherein the web-control is a turn/zoom web-control.

8. The GUI of claim 1, further comprising a help avatar, the help avatar displayed in proximity to the nested surfaces.

9. The GUI of claim 8, wherein the help avatar is a semi-translucent hologram head and shoulders of an individual.

10. The GUI of claim 1, further comprising a globe icon, the globe icon displayed in proximity to the nested surfaces.

11. The GUI of claim 1, wherein more than one line can be associated with a first node and a second node.

12. The GUI of claim 1, wherein the line represents a relationship between the nodes.

13. The GUI of claim 12, wherein the relationship is selected from the group consisting of a social relationship, an historical relationship, a geographical relationship, a temporal relationship, a cultural relationship, a linguistic relationship, a genetic relationship, a familial relationship, a technological relationship, and a mathematical relationship.

14. The GUI of claim 12 wherein the relationship between the nodes is used to determine a relationship between another pair of nodes.

15. The GUI of claim 1 further comprising a hyperlink to a user community forum.

16. An image-forming system, the image-forming system comprising an image generated by a machine displayed by a man-machine interface, the image having:
   at least one virtual surface, wherein the at least one virtual surface is invisible to a user of the man-machine interface, and the at least one virtual surface represents a particular time period;

at least one first node on the virtual surface;

at least one second node on the virtual surface;

at least one line having an endpoint associated with the first node and a second endpoint associated with the second node;

wherein each node is hyperlinked to a curated database of records;

wherein each line represents a relationship between the associated nodes;

and wherein the relationships form a relational network and the relational network forms a part of a knowledge web in at least a three-dimensional virtual space displayed by the man-machine interface.

17. The image-forming system of claim 16 wherein the line between the two nodes further is described by a mathematical model in multi-dimensions.

18. The image-forming system of claim 16, wherein more than one relationship can be associated with a first node and a second node.

19. The image-forming system of claim 16 wherein the curated database of records comprises the biographical records of individuals stored on machine-readable media.

20. The image-forming system of claim 19 wherein the image further displays the relationships between more than two individuals' records.

21. The image-forming system of claim 16 further comprising an interface control display and wherein the image can be manipulated by a user at the man-machine interface using the interface control.

22. A method for creating a graphical user interface (GUI) for discovering relationships between curated records in a database, the GUI presented at a man-machine interface, the method comprising the steps of:
   (i) providing a software program on machine readable media;
   (ii) providing a curated database on machine-readable media;
   (iii) rendering a plurality of nested spherical surfaces, wherein each surface represents a surface of the Earth at a particular time period;
   (iv) rendering a plurality of nodes, the plurality of nodes comprising at least one first node and at least one second node, and each node associated with a location on at least one of the plurality of spherical surfaces;
   (v) rendering a plurality of lines, at least one line having a first endpoint associated with the first node and a second endpoint associated with the second node;
   (vi) rendering a graphical user interface control;
   (vii) hyperlinking each node to a record in the database, each record having a unique identifier;
   (viii) rendering the unique identifier at the respective node;
   (ix) high-lighting nodes having lines associated with at least two other nodes, thereby creating a relationship between the nodes;

the steps resulting in creating a GUI for discovering relationships between curated records in a database.

23. A method for building a knowledge web on a machine, the method comprising:
   (i) assembling a plurality of records in a database on machine-readable media on a machine wherein the records have a plurality of individual data;
   (ii) linking at least one first record with at least one second record, the records thereby becoming related to one another through the link and thereby creating a relationship between the records;
   (iii) selecting a mathematical model that defines the relationship between the records in multi-dimensional space, wherein the multi-dimensional space is at least four-dimensional space;

recognizing the relationship between the records; thereby building the knowledge web on a machine.

24. The method of claim 23, wherein the link is associated with at least one relationship and more than one relationship can be associated with a first record and a second record.

* * * * *